United States Patent
Sun et al.

(10) Patent No.: US 11,804,774 B2
(45) Date of Patent: Oct. 31, 2023

(54) VOLTAGE CONVERTER

(71) Applicant: WINGCOMM Co. Ltd., Nantong (CN)

(72) Inventors: Shuang Sun, Shanghai (CN); Yun Bai, Beijing (CN); Wei Mao, Palo Alto, CA (US); Zuodong Wang, Beijing (CN)

(73) Assignee: WINGCOMM Co. Ltd., Nantong (CN)

( * ) Notice: Subject to any disclaimer, the term of this patent is extended or adjusted under 35 U.S.C. 154(b) by 281 days.

(21) Appl. No.: 17/173,964

(22) Filed: Feb. 11, 2021

(65) Prior Publication Data

US 2022/0200450 A1 Jun. 23, 2022

(30) Foreign Application Priority Data

Dec. 22, 2020 (CN) .......................... 202011526897.3

(51) Int. Cl.
*H02M 3/157* (2006.01)
*H02M 3/158* (2006.01)
*H02M 1/00* (2006.01)

(52) U.S. Cl.
CPC ......... *H02M 3/157* (2013.01); *H02M 3/1588* (2013.01); *H02M 1/0032* (2021.05)

(58) Field of Classification Search
CPC .... H02M 3/1588; H02M 1/0032; H02M 1/14; H02M 1/36; H02M 3/158; H02M 1/0035
See application file for complete search history.

(56) References Cited

U.S. PATENT DOCUMENTS

| | | |
|---|---|---|
| 6,275,016 B1 | 8/2001 | Ivanov |
| 6,366,070 B1 | 4/2002 | Cooke |
| 7,327,127 B2 | 2/2008 | Ho |
| 7,495,419 B1 | 2/2009 | Ju |
| 7,746,042 B2 | 6/2010 | Williams |
| 7,804,285 B2 | 9/2010 | Nishida |
| 8,558,672 B2 | 10/2013 | Zand |
| 8,823,497 B2 | 9/2014 | Hutzler |
| 8,907,642 B1 | 12/2014 | Burstein |

(Continued)

FOREIGN PATENT DOCUMENTS

| | | |
|---|---|---|
| CA | 2625409 C | 10/2016 |
| JP | 2009064346 A | 3/2009 |

OTHER PUBLICATIONS https://www.eetimes.com/combine-power-feed-and-data-link-via-cable-for-remote-per, Feb. 11, 2021.

*Primary Examiner* — Kyle J Moody
(74) *Attorney, Agent, or Firm* — David R. Stevens; Stevens Law Group

(57) ABSTRACT

Voltage converter systems and methods are described. One aspect includes extracting energy from one or more data lines. A feedback voltage is derived from the extracted energy. Responsive to the value of the feedback voltage being less than a reference voltage value, a waveform modulation controller is switched to a pulse-frequency modulation (PFM) mode. Subsequent to switching the waveform modulation controller to the PFM mode, additional energy is extracted from the one or more digital data lines. Another feedback voltage is derived from the additional extracted energy. Responsive to the value of other feedback voltage being greater than the reference voltage value, the waveform modulation controller is further switched from the PFM mode to a pulse-skipping modulation (PSM) mode.

20 Claims, 6 Drawing Sheets

(56) References Cited

U.S. PATENT DOCUMENTS

| | | | |
|---|---|---|---|
| 9,024,932 B2 | 5/2015 | Chen | |
| 9,065,336 B2* | 6/2015 | Huang | H02J 3/381 |
| 9,306,637 B2 | 4/2016 | Kuhl | |
| 9,350,240 B2 | 5/2016 | Dong | |
| 9,484,800 B2 | 11/2016 | Faingersh | |
| 9,722,482 B2 | 8/2017 | De Cremoux | |
| 10,511,225 B1* | 12/2019 | de Marco | H02M 3/157 |
| 10,845,833 B1* | 11/2020 | Dietrich | H02M 1/32 |
| 10,958,162 B1* | 3/2021 | Ibrahim | H02M 3/156 |
| 11,469,669 B2* | 10/2022 | Pahkala | H03K 7/08 |
| 2006/0273772 A1 | 12/2006 | Groom | |
| 2007/0257647 A1* | 11/2007 | Chen | H02M 3/157 |
| | | | 323/282 |
| 2008/0218284 A1 | 9/2008 | Chen | |
| 2008/0224674 A1 | 9/2008 | Hasegawa | |
| 2008/0225563 A1* | 9/2008 | Seo | H02M 3/156 |
| | | | 363/123 |
| 2009/0033305 A1 | 2/2009 | Hane | |
| 2009/0079408 A1 | 3/2009 | Qiao | |
| 2010/0225293 A1 | 9/2010 | Wang | |
| 2011/0210707 A1 | 9/2011 | Marsili | |
| 2016/0049859 A1* | 2/2016 | de Cremoux | H02M 3/1588 |
| | | | 323/282 |
| 2016/0094126 A1* | 3/2016 | Liu | H03K 7/06 |
| | | | 455/73 |
| 2019/0172379 A1* | 6/2019 | Park | H02M 3/158 |
| 2020/0144916 A1* | 5/2020 | Lee | H02M 1/36 |

* cited by examiner

VOLTAGE CONVERTER

BACKGROUND

Technical Field

The present disclosure relates to systems and methods implementing a boost converter that derives power from one or more data lines. The boost converter may automatically switch between a pulse-frequency modulation operation mode and a pulse-skipping operation mode.

Background Art

In a communication system, an associated communication integrated circuit (IC) needs electrical power supplied by a power source to process data being transmitted or received. Electrical power is usually provided by an external power supply; however, this adds bulk and extra cost to the communication system.

In some environments, an external power supply can include a boost converter used to supply power to a communication IC. One limitation associated with a boost converter is an inrush (peaking) current when the boost converter is switched on. (Inrush current is an initial spike current drawn by the boost converter when the boost converter is switched on.) A typical boost converter may include a large-valued capacitance connected at both the input and the output to filter the noise of the input voltage and output voltage. Each capacitor requires current to charge the voltage to a steady state. The voltage across these capacitors can abruptly change when the boost converter is powered on, resulting in an inrush current. The magnitude of the inrush current can cause a (potentially significant) drop in supply voltage generated by the boost converter due to the resistance of the power path. The supply voltage drop can in turn cause a system reset and/or activation of over-current protection circuitry.

For DC-DC converters, there exist at least three control schemes: pulse-width modulation (PWM), pulse-frequency modulation (PFM), and Pulse-skipping modulation (PSM). PFM is generally used under light load conditions, and provides good power conversion efficiency. When using PSM, the modulation frequency is reduced from a maximum modulation frequency using cycle skipping, to maintain efficiency and load independence. An associated circuit filter can be designed to provide reduced electromagnetic interference (EMI). In contrast, when using PFM, the harmonic of the output voltage is not constant and changes with the load. The output voltage cannot be easily filtered, potentially causing EMI occurrences in communication applications. PFM may also exhibit a relatively large inrush current when starting up due to the fast transition response.

Additionally, when using PSM, the modulation factor is proportional to the output power, and the efficiency of the associated power converter is independent of the load. A PSM boost converter generally has a substantially constant frequency with a light load, a faster transient response, and a low harmonic frequency as compared to PFM. However, when using PSM, the voltage ripple is also larger as compared to PFM.

SUMMARY

Aspects of the invention are directed to systems and methods for implementing a boost converter that derives electrical power from one or more digital data lines.

One method includes extracting energy from one or more data lines. A feedback voltage is derived from the extracted energy. The feedback voltage is compared to a reference voltage value. Responsive to determining that a value of the feedback voltage is less than the reference voltage value, a waveform modulation controller is switched to a PFM mode.

Subsequent to switching the waveform controller to the PFM mode, additional energy is extracted from the one or more digital data lines. Another feedback voltage is derived from the additional extracted energy. The other feedback voltage is compared to the reference voltage. Responsive to the value of the other feedback voltage being greater than the reference voltage value, the waveform modulation controller is switched from the PFM mode to a PSM mode.

Another method includes extracting energy from one or more data lines. A feedback voltage is derived from the extracted energy. The feedback voltage is compared to a reference voltage value. Responsive to determining that a value of the feedback voltage is greater than or equal to the reference voltage value, a waveform modulation controller is switched to a PSM mode.

Subsequent to switching the waveform controller to the PSM mode, additional energy is extracted from the one or more digital data lines. Another feedback voltage is derived from the additional extracted energy. The other feedback voltage is compared to the reference voltage. Responsive to the value of the other feedback voltage being less than the reference voltage value, the waveform modulation controller is switched from the PSM mode to a PFM mode.

A boost converter may include a power harvester configured to extract energy from one or more digital data lines. The boost converter may further include circuitry configured to derive a feedback voltage from the extracted energy. A waveform modulation controller may be configured to compare a feedback voltage value to a reference voltage value, and operate in one of a PFM mode or a PSM mode based on the results of the comparison. The associated operation may include switching to the PFM mode when the feedback voltage value transitions from greater than or equal to the reference voltage value to less than the reference voltage value. The associated operation may include switching to the PSM mode when the feedback voltage value transitions from less than the reference voltage value to greater than or equal to the reference voltage value.

A method for boost conversion includes extracting energy from one or more digital data lines. A feedback voltage may be derived from the extracted energy. Based on a value of the feedback voltage relative to a reference voltage value, a waveform modulation controller may be switched to one of a PFM mode or a PSM mode. Subsequent to switching the waveform controller, additional energy may be extracted from the one or more digital data lines. Another feedback voltage may be derived from the additional extracted energy. Based on a value of the other feedback voltage relative to the reference voltage value, the waveform modulation controller may be further switched to the other of the PFM mode or the PSM mode.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

Figure 1:
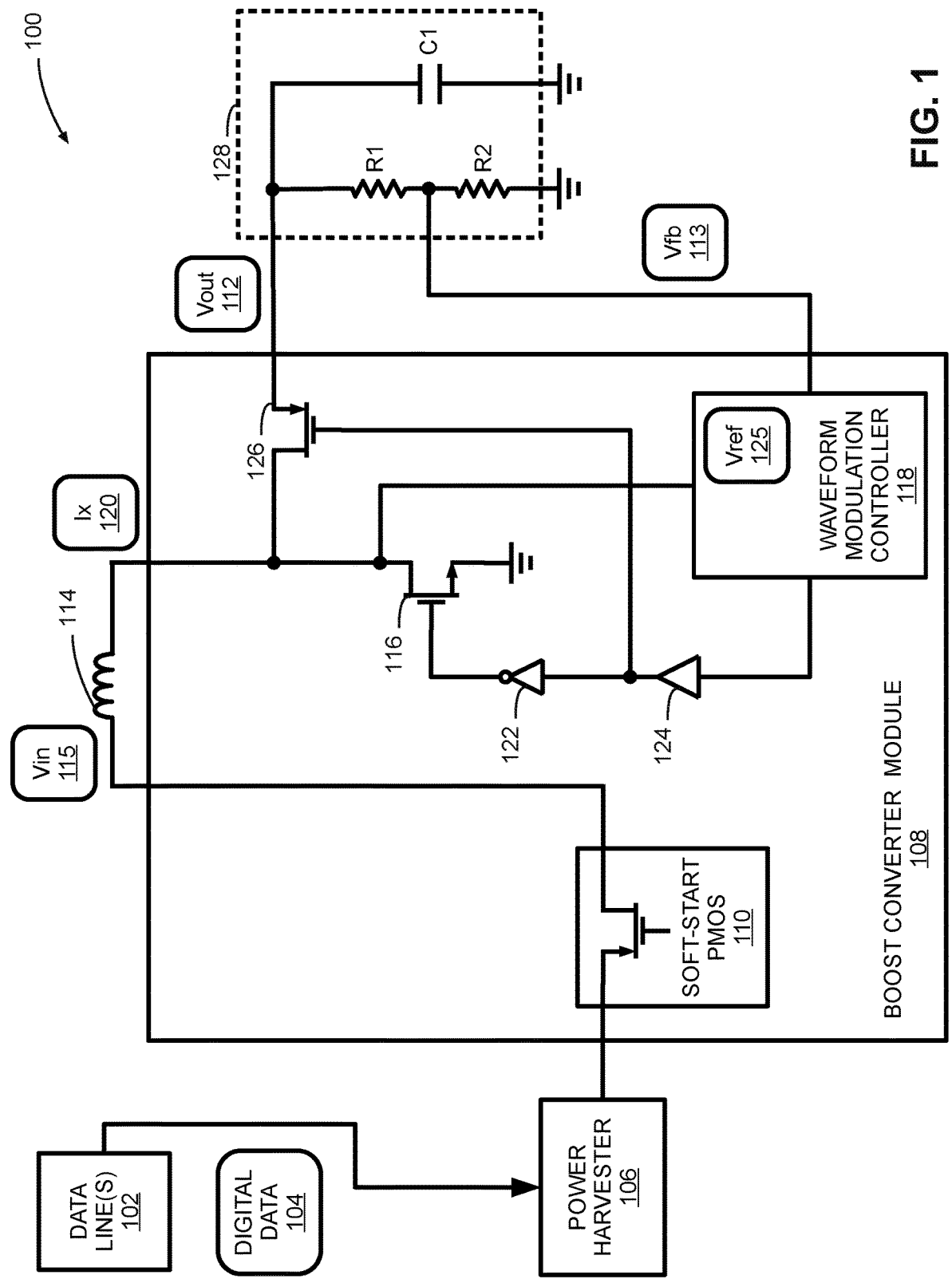
FIG. 1 is a circuit diagram depicting an example boost converter system.

In the following description, reference is made to the accompanying drawings that form a part thereof, and in which is shown by way of illustration specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, databases, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware-comprised embodiment, an entirely software-comprised embodiment (including firmware, resident software, micro-code, etc.), or an embodiment combining software and hardware aspects that may all generally be referred to herein as a "circuit," "module," or "system." Furthermore, embodiments of the present disclosure may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random-access memory (RAM) device, a read-only memory (ROM) device, an erasable programmable read-only memory (EPROM or Flash memory) device, a portable compact disc read-only memory (CDROM), an optical storage device, a magnetic storage device, and any other storage medium now known or hereafter discovered. Computer program code for carrying out operations of the present disclosure may be written in any combination of one or more programming languages. Such code may be compiled from source code to computer-readable assembly language or machine code suitable for the device or computer on which the code can be executed.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

The flow diagrams and block diagrams in the attached figures illustrate the architecture, functionality, and operation of possible implementations of systems, methods, and computer program products according to various embodiments of the present disclosure. In this regard, each block in the flow diagrams or block diagrams may represent a module, segment, or portion of code, which includes one or more executable instructions for implementing the specified logical function(s). It is also noted that each block of the block diagrams and/or flow diagrams, and combinations of blocks in the block diagrams and/or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks.

Aspects of the invention described herein are configured to implement a boost converter that outputs a voltage without requiring an external power source. Power to be transferred to the output voltage is harvested from one or more digital data lines. The boost converter also includes a PMOS transistor that mitigates undesirable impacts associated with (e.g., relatively larger) inrush current. The boost converter may be configured to switch automatically between a PFM mode of operation and a PSM mode of operation.

FIG. 1 is a circuit diagram depicting an example boost converter system 100. As depicted, boost converter system 100 includes a boost converter module 108, a power harvester 106, an inductor 114, and one or more data line(s) 102. Boost converter module 108 may further include a soft-start PMOS 110, a waveform modulation controller 118, an output stage transistor 126, an RC network 128, a buffer 124, an inverting buffer 122, and a transistor 116. RC network 128 may further include a resistor R1, a resistor R2, and a capacitor C1. While the systems and methods described herein are related to a boost converter, similar design techniques may be used to design a buck converter or a buck-boost converter.

In an aspect, power harvester 106 is configured to harvest power from digital data 104 associated with data line(s) 102. In general, data line(s) 102 may include one or more digital data lines that transmit binary data, for example, one or more sequences of zeros and ones, associated with a communication system. Different electrical power levels can be used to represent a zero and a one. Power harvester 106 can extract energy from the electric power levels used to represent zeros and ones.

In an aspect, the extracted energy is received by soft-start PMOS 110. Soft-start PMOS can include a (e.g., a relatively large) PMOS transistor configured to limit any inrush current that may be generated when boost converter module 108 is started up. In an aspect, a large PMOS transistor is characterized by a relatively large width to achieve a low on-state resistance that helps minimize power losses. In an aspect, the PMOS transistor may be replaced by an NMOS transistor with appropriate electrical connection modifications.

In an aspect, an output voltage Vin 115 from soft-start PMOS 110 is transmitted to inductor 114. Inductor 114 as a reactive component induces current Ix 120 to flow through inductor 114. In other words, current Ix 120 is a current induced in inductor 114, generated by voltage Vin 115. Vin 115 may provide power to other components of boost conversion module 108.

In an aspect, current Ix 120 may be divided into multiple components. One current component of Ix 120 is input to output stage transistor 126 that generates output voltage Vout 112. Output voltage Vout 112 is an output voltage of boost converter module 108 that may be supplied to a load. Another current component of Ix 120 may be used to generate an internal reference voltage, Vref 125, used by waveform modulation controller 118.

In an aspect, a voltage divider (e.g., a resistor divider) associated with RC network 128 is used to generate a feedback voltage Vfb 113 that is sampled by waveform modulation controller 118. Feedback voltage Vfb 113 is a fraction of output voltage Vout 112, determined by the following formula:

$$Vfb = \frac{R1}{R1 + R2} \times Vout$$

In an aspect, capacitor C1 may be used to filter any ripple in output voltage Vout 112.

In an aspect, waveform modulation controller 118 may be configured to compare feedback voltage Vfb 113 with reference voltage Vref 125. If Vfb 113 is less than Vref 125, then waveform modulator controller 118 may transition boost converter module 108 to operate in a PFM mode. If Vfb 113 is greater than or equal to Vref 125, then waveform modulator controller 118 may transition boost converter module 108 to operate in a PSM mode. Waveform modulation controller 118 may be configured to switch boost converter module 108 from a PFM mode to a PSM mode or vice versa, depending on (changes to) the relationship between Vfb 113 and Vref 125.

The output of waveform modulation controller 118 is output to a gate terminal of output stage transistor 126, via a noninverting buffer 124. In an aspect, output stage transistor 126 is a MOSFET device. Noninverting buffer 124 may be configured to provide a driving capability that enables waveform modulation controller 118 to drive output stage transistor 126.

The output of noninverting buffer 124 may also be input to the gate of a transistor 116 via an inverting buffer 122. In an aspect, each of transistors 116 and transistor 126 functions as a power switch. Boost converter system 100 may use a combination of transistors 116 and 126 as power switches along with inductor 114 to transfer energy from the input to the output. When transistor 116 turns off and transistor 126 turns on, inductor 114 stores energy from input voltage Vin 115. When transistor 116 turns on and transistor 126 turns off, inductor 114 transfers energy to output voltage Vout 112. In an aspect, transistor 116 is a MOSFET device. In one aspect, boost converter module 108 may be implemented on an integrated circuit. In another aspect, boost converter module 108 may be implemented using discrete components.

Figure 2:
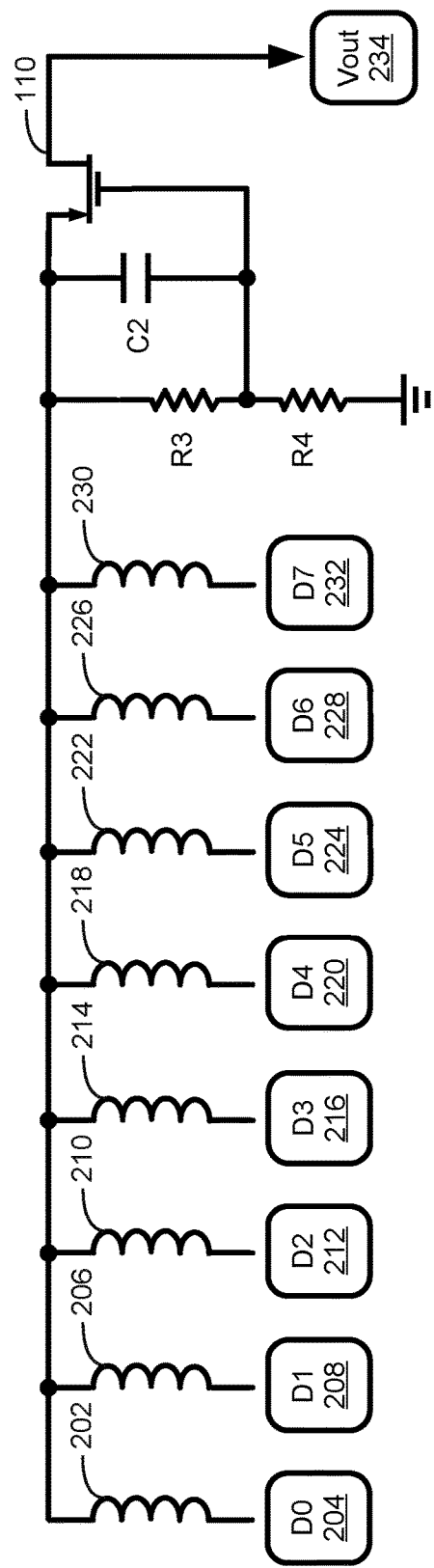
FIG. 2 is a circuit diagram depicting an example power-harvesting circuit.

FIG. 2 is a circuit diagram depicting an example power-harvesting circuit 200. Power-harvesting circuit 200 may be used to implement and/or included in power harvester 106. As depicted, power-harvesting circuit 200 can include inductors 202, 206, 210, 214, 218, 222, 226, and 230. Power-harvesting circuit 200 may also include an RC network comprised of a resistor R3, a resistor R4, and a capacitor C2. In an aspect, soft-start PMOS 110 may be included in power-harvesting circuit 200. In another aspect, soft-start PMOS 110 is external to power-harvesting circuit 200, as depicted in FIG. 1 (power harvester 106 may include aspects of power-harvesting circuit 200).

In an aspect, each of inductors 202, 206, 210, 214, 218, 222, 226, and 230 is electrically coupled (i.e., connected) to a corresponding digital data line (e.g., there may be 8 data lines). Each digital data line may be included in data line(s) 102, and may carry digital data in the form of binary ones and zeros. The digital data on each data line may be received by each of inductors 202, 206, 210, 214, 218, 222, 226, and 230. For example, inductor 202 may receive electrical energy associated with digital data D0 204, inductor 206 may receive electrical energy associated with digital data D1 208, inductor 210 may receive electrical energy associated with digital data D2 212, inductor 214 may receive electrical energy associated with digital data D3 216, inductor 218 may receive electrical energy associated with digital data D4 220, inductor 222 may receive electrical energy associated with digital data D5 224, inductor 226 may receive electrical energy associated with digital data D6 228, and inductor 230 may receive electrical energy associated with digital data D7 232.

In an aspect, a stream of binary data (data comprising zeros and ones) associated with each of D0 204 through D7 232 includes an AC component (i.e., a time-varying portion) and a DC component (i.e., an average power level). Each of inductor 202 through inductor 230 acts as an electrical filter, substantially filtering out the AC part of each of D0 204 through D7 232, respectively. The corresponding DC portions of each of D0 204 through D7 232 are additively transmitted to the RC network comprised of resistors R3 and R4, and capacitor C2.

In an aspect, each of inductor 202 through inductor 230 may be implemented as an inductor bead on a circuit. Collectively, D0 204 through D7 232 may comprise an 8-bit parallel data bus. Some aspects of power-harvesting circuit 200 may function with wider data buses (e.g., 16-bit, 32-bit, etc.); other aspects of power-harvesting circuit 200 may function with narrower data buses (e.g., 4-bit).

A general approach to designing power-harvesting circuit 200 is to treat the digital data on each data line as an AC waveform and rectify the data/AC waveform to provide DC power. In an aspect, this may be implemented by combining the signal (i.e., the binary digital data) and power on a single data line (e.g., on each of D0 204 through D7 232). In an aspect, each of D0 204 through D7 232 transmits data simultaneously. Each of inductor 202 through inductor 230 isolates (i.e., filters out) the AC signal of the data associated with the corresponding data line, and transmits the DC voltage and current of data line. The speed of data transmitted on each data line is usually significantly higher than the bandwidth of each inductor, so each bead or inductor (e.g., inductor 202) is sufficient to filter the AC signal of the data. By using multiple data lines, the current capacities of all the data line are added together to get a composite power signal that may be used drive the heavier load of the boost converter.

When input voltage to power-harvesting circuit 200 is turned on, an inrush spike current can occur. Limiting inrush spike current may be appropriate due to the current to charge the input capacitors and output capacitors. One approach to limit inrush current is by using an active inrush current-limiting circuit such as a big, discrete MOSFET. A discrete MOSFET, however, is physically bulky, and may occupy a footprint area comparable to boost converter module 108. For example, a discrete PMOS may have a package such as TO-263, with dimensions of 11 mm×16.6 mm. This size is may be large as compared to boost converter module 108.

To avoid using a MOSFET, a PMOS (e.g., soft-start PMOS 110) may be integrated into an integrated circuit associated with boost converter system 100 (or boost converter module 108). In an aspect, soft-start PMOS 110 may be series-connected between the voltage input of boost converter module 108 and the output of power harvester 106. In another aspect, soft-start PMOS 110 may be integrated into boost converter module 108, and may be series-connected to power harvester 106 (as depicted in FIG. 1).

In an aspect, soft-start PMOS 110 is initially off, with the gate of soft-start PMOS 110 being pulled up to input voltage through resistor R3 when powered on. The gate will then discharge through the resistor R4, with the discharge time being dependent on the RC time constant of resistor R4 and capacitor C2. The slow discharge of the gate of soft-start PMOS 110 can limit the inrush current. After capacitor C2 is fully discharged, the gate of soft-start PMOS 110 is pulled low, and soft-start PMOS 110 is fully turned on. Soft-start PMOS 110 outputs an output voltage Vout 234 that is input as an input voltage (e.g., Vin 115) to downstream components of boost converter module 108 (i.e., Vout 234 and Vin 115 may be the same).

Accordingly, power-harvesting circuit 200 powers components of boost converter system 100 with energy harvested from data lines D0 204 through D7 232 (which may be included in data line(s) 102). For example, boost converter module 108 can generate output voltage Vout 112 without receiving power from an external power supply.

Figure 3:
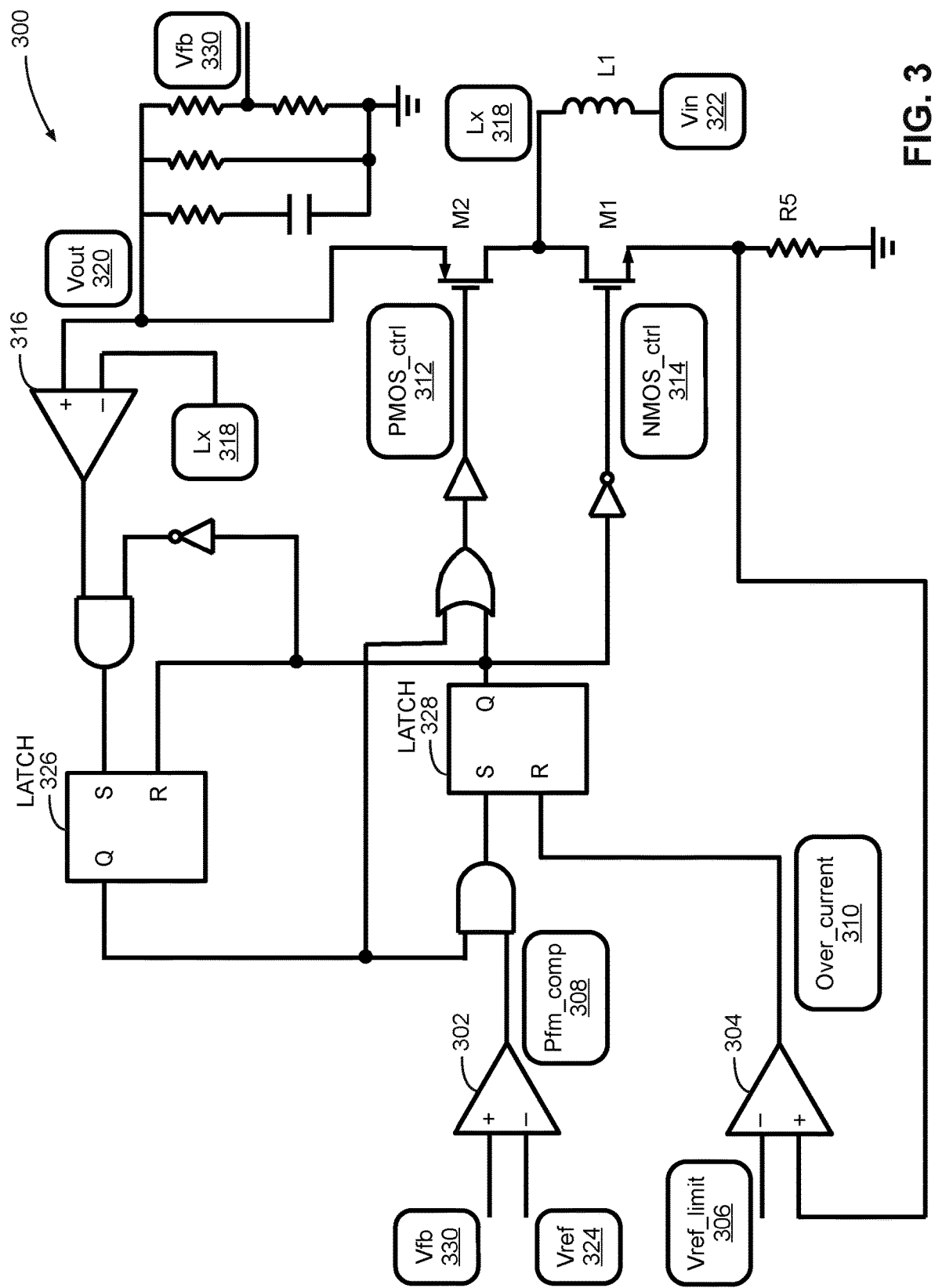
FIG. 3 is a circuit diagram depicting a PFM boost converter as implemented in prior art.

FIG. 3 is a circuit diagram depicting a PFM boost converter 300. As depicted, PFM boost converter 300 includes one or more operational amplifiers (op-amps), such as comparator 302, comparator 304, and comparator 316. Each comparator may be implemented using an op-amp. PFM boost converter 300 may also include a latch 326, a latch 328, a resistor R5, an NMOS transistor M1, a PMOS transistor M2, and other logic circuitry.

During operation of PFM boost converter 300, when a feedback voltage Vfb 330 generated by an RC network is lower than a bandgap reference voltage Vref 324, a PFM comparator output signal, Pfm_comp 308, as generated by comparator 302, is high. NMOS M1 is on, and starts to store energy in inductor L1. This turns the NMOS M1 off; PMOS M2 is switched on after a fixed dead time.

In an aspect, bandgap reference voltage Vref 324 is preset to approximately 1.2V. Feedback voltage Vfb 330 may be approximately 0.6V. The value of output voltage Vout 320 typically depends on the end application. For example, a circuit powered by boost converter module 108 may utilize Vout 320 having a value of approximately 3.3V.

When PMOS M2 on, the energy stored in inductor L1 will transfer to an output load and an output capacitor, as an output voltage Vout 320. After a while, the charge current Lx 318 drops to zero when the inductor runs out of energy. This triggers a zero-cross comparator (i.e., comparator 316), which compares Lx 318 to Vout 320. If the output of the zero-cross comparator output is low, a combination of latch 326 and associated logic circuitry shut down PMOS M2 to prevent the inductor current Lx from flowing in a backward direction, which would reduce the efficiency of PFM boost converter 300. Signals PMOS_ctrl 312 and NMOS_ctrl 314 generated by logic circuitry associated with PFM boost converter 300, and are used to switch PMOS M2 and NMOS M1 on or off, respectively. In an aspect, resistor R5 may be used to sense a current limit, as described subsequently. In an aspect, voltage Vin 322 may be derived from extracted data line energy extracted from one or more data lines such as data line(s) 102. Vin 322, similar to Vin 115, may be used as an input voltage to boost converter module 108 as a power source. In aspect, comparators 302, 304, and 316 may be associated with a PFM or a PSM mode of operation of boost converter 300, and with boost controller 300 switching between a PFM mode and a PSM mode of operation.

Figure 4:
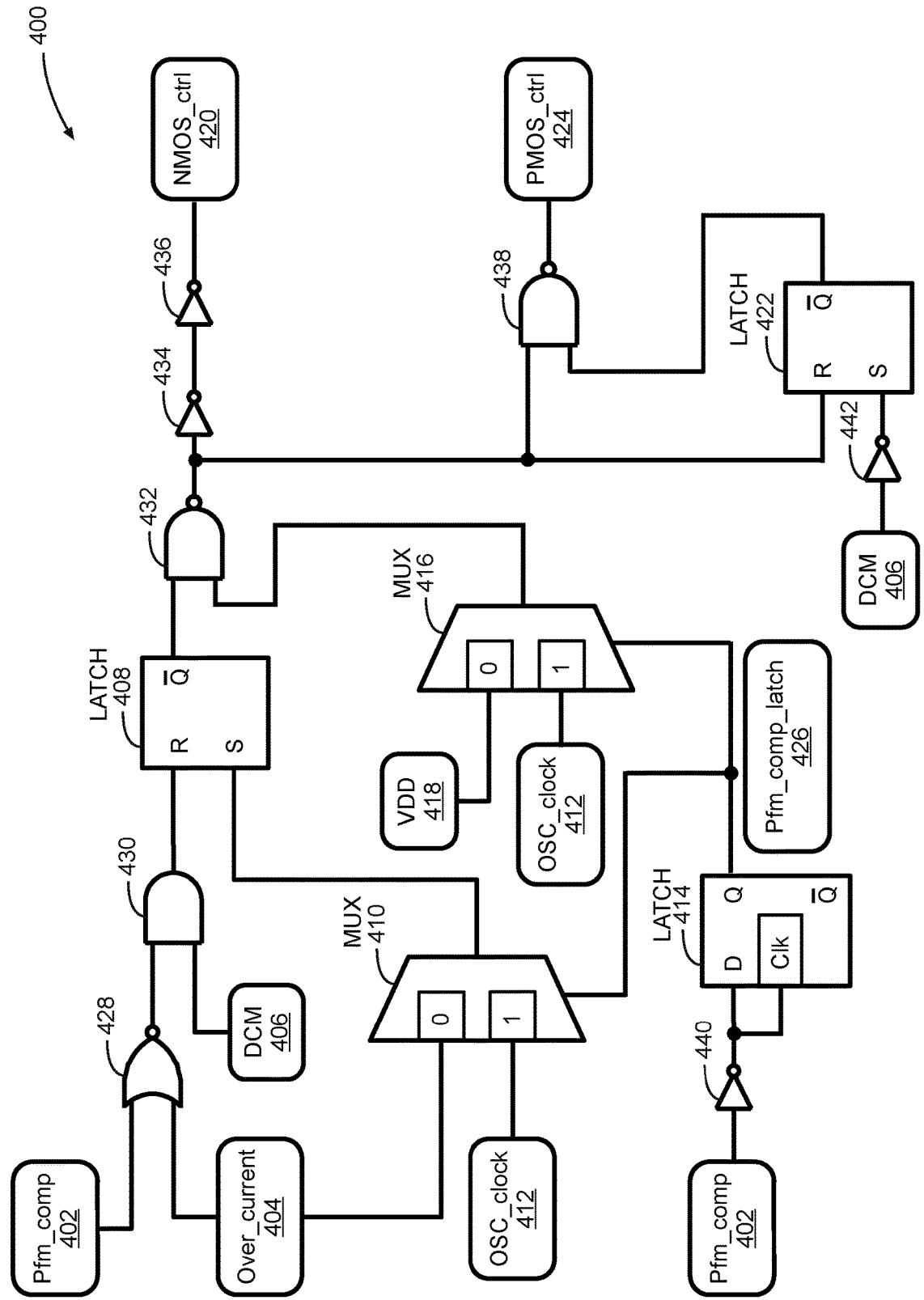
FIG. 4 is a logic circuit diagram depicting an example PFM to PSM switching controller.

FIG. 4 is a logic circuit diagram depicting an example PFM to PSM switching controller 400. As depicted, PFM to PSM switching controller 400 includes a latch 408, a latch 414, a latch 422, a multiplexer (MUX) 410, a MUX 416, a NOR gate 428, an AND gate 430, a NAND gate 432, an inverting buffer 434, an inverting buffer 436, a NAND gate 438, an inverting buffer 440, and an inverting buffer 442. In an aspect, PFM to PSM switching controller 400 may be used to control PFM boost converter 300. A combination of PFM to PSM switching controller 400 in combination with PFM boost converter 300 may comprise a portion of waveform modulation controller 118.

After power on, a boost converter module (e.g., boost converter module 108) associated with PFM to PSM switching controller 400 operates in a PFM mode to reduce inrush current. Upon power up, an output voltage associated with the boost converter module (e.g., output voltage Vout 112 associated with boost converter module 108, or Vout 320 associated with PFM boost converter 300) begins to increase. A feedback voltage is derived from the output voltage (e.g., Vfb 113 derived from Vout 112 using the R1-R2 resistor divider in RC network 128, or Vfb 330 derived from Vout 320 by a resistor divider in the associated RC network). When the feedback voltage reaches (i.e., is greater than or equal to) a target output voltage (also referred to herein as a "reference voltage," such as Vref 324), the PFM mode is shut off, and a PSM mode turned on automatically to increase an efficiency associated with the boost converter, and to reduce EMI. On the other hand, if Vfb 330 drops to a value that is less than Vref 324, then waveform modulation controller switches the mode of operation of boost converter module 108 from the PSM mode to the PFM mode.

In an aspect, the automatic switching from the PFM mode to the PSM mode is achieved by a combination of latch 408, MUX 410, and MUX 416. When the output voltage is smaller than an output target voltage (e.g., when Vfb 330 derived as a linear scaling-down on Vout 320 is less than Vref 324), the signal Pfm_comp 308 from (PFM) comparator 302 is low. In an aspect, the Pfm_comp signal 402 is identical to Pfm_comp 308. When Pfm_comp signal 402 is low, a latched output of latch 414 is held low until the output voltage (e.g., Vout 320) rises up to the target voltage (i.e., until Vfb 330 is greater than or equal to Vref 324). When the output voltage is greater than or equal to than the target voltage, the signal Pfm_comp_latch 426 output from latch 414 is latched to a high value. When Pfm_comp_latch 426 is low (Vfb 330 is less than Vref 324), MUX 410 and MUX 416 select the PFM mode of operation. On the other hand, when Pfm_comp_latch 426 is high (Vfb 330 is greater than or equal to Vref 324), MUX 410 and MUX 416 select the PSM mode. In this way, the automatic switching control of PFM mode and PSM mode is achieved.

In a pulse skipping modulation mode (PSM), the operations of boost converter module 108 can have three states. In the first state, the NMOS M1 is turned on, and may start to store energy in inductor L1. The second state is reached when inductor current flowing through inductor L1 reaches a current limit associated with inductor L1. In this second state, NMOS M1 is turned off, and PMOS M2 is turned on. In the third state, when PMOS M2 is on, the energy stored in inductor L1 is transferred to an output load and an output capacitor. As inductor L1 discharges its current, the charge current drops to zero. In this third state, both of NMOS M1 and PMOS M2 are turned off, and the boost converter (i.e., boost converter module 108) may stay in an idle "skip" mode. The load current discharges through the output capacitor(s) during this time.

In an aspect, boost converter module 108 may enter an active state again when the output voltage drops below a certain reference threshold (in which case Vfb 330 that is derived from and is a linear function of Vout 320 is less than reference voltage Vref 324). This would trigger a PFM mode of operation.

In an aspect, boost converter 108 operating in a PSM mode may use three comparators as used in a PFM mode operation (e.g., comparators 302, 304, and 316). Boost converter module 108 operating in a PSM mode may include one or more circuits or circuit components that control one or more gate intervals associated with NMOS M1 and PMOS M2.

In an aspect, one or more circuit components included in PFM to PSM switching controller 400 (e.g., MUX 410 and MUX 416) may be operated at a fixed frequency decided by an oscillator clock signal OSC_clock 412 that is input to each of MUX 410 and MUX 416. In an aspect, NMOS M1 and/or PMOS M2 may function as switches. In an aspect, the NMOS M1 switch may be turned on at the rising edge of OSC_clock 412, and when Vfb 330<Vref 324. In an aspect, a frequency of OSC_clock 412 may be set to 1 MHz, with an associated switching time of approximately 1 us. NMOS M1 may be turned off when inductor current Lx 318 reaches the current limit (I_limit). The peak current limiting is achieved by sensing the voltage drop across resistor R5 when NMOS M1 is on. In an aspect, the current limit is determined by the peak current of inductor L1. This current limit may be approximately twice of a load current. For example, if the load current is 100 mA, the current limit may be set to 200 mA. The sensed voltage across resistor R5 when NMOS M1 is on may be compared to Vref_limit signal 306, by comparator 304. In an aspect, When inductor current Lx 318 reaches I_limit, comparator 304 asserts Over_current signal 310 that resets latch 328. The Q signal associated with latch 328 goes low, turning NMOS M1 off, and PMOS M2 on.

In an aspect, a zero-crossing sense circuit may be used to monitor the voltage drop across PMOS M2 when PMOS M2 conducts. This is achieved by using comparator 316 to compare Vout 320 with a voltage associated with Lx 318. If Vout 320 is bigger than the voltage associated with Lx 318, the output of comparator 316, along with latch 326 and other associated logic circuitry turn PMOS M2 off to prevent any current inversion.

In an aspect, boost converter module 108 works in a PFM mode when powered on. At power on Pfm_comp signal 308 (identical to Pfm_comp signal 402) is on. At this time, a discontinuous-conduction mode (DCM) signal 406 is input to latch 422 via inverting buffer 442. In an aspect, a DCM is a mode or state of a PFM or PSM conversion mode. An output of latch 408 is used to generate (i.e., assert) NMOS_ctrl signal 420 that is used to turn on NMOS M1, via NAND gate 432, inverting buffer 434, and inverting buffer 436. The Over_current signal 404 (similar to Over_current signal 310) resets latch 408, via NOR gate 428 and AND gate 430. This further de-asserts NMOS_ctrl signal 420 to turn off NMOS M1. In an aspect, NMOS_ctrl signal 420 may be input to latch 422 to turn on PMOS M2. Signal PMOS_ctrl 424 may be generated by a combination of NMOS_ctrl 420 and an output of latch 422. NMOS_ctrl 420 and the output of latch 422 are input to NAND gate 438. PMOS_ctrl 424 is the output of NAND gate 438. When DCM signal 406, set to high and then inverted by inverting buffer 442, appears at the S input to latch 422, it set the RS latch2 to turn off PMOS M2. In an aspect, DCM signal 406 is generated by comparator 316. Vout 320 and Lx 318 are the two inputs to comparator 316, and DCM 406 is the output of the comparator 316.

In an aspect, after Vfb 330 rises to a value that is greater than or equal to that of voltage Vref 324, PFM comparator 302 reverses its output. The output of comparator 302 (i.e., Pfm_comp 402) is input to latch 414 via inverting buffer 440. Pfm_comp 402 may be latched by latch 414. Latch 414 outputs a Pfm_comp_latch signal 426 at a logic high value. This toggles the outputs of both MUX 410 and MUX 416, thereby switching boost converter module 108 into a PSM mode of operation. In the PSM mode, NMOS M1 is turned on at the rising edge of the OSC_clock 412 when Pfm_comp 402 is at a logic low value. A logic high value of Over_current 404 resets latch 408 via NOR gate 428 and AND gate 430. In an aspect, NMOS_ctrl signal 420 may be used to reset latch 422 to turn on PMOS M2 via PMOS_ctrl signal 424. When the DCM signal 406 appears high, it sets latch 422 to turn off PMOS M2. A NAND output of DCM signal 406 and PMOS_ctrl signal 424 as generated by NAND gate 438 turns of PMOS M2.

In an aspect, VDD 418 may be used as a logic high level voltage. When the output of latch 414 low, MUX 416 selects VDD 418, and the output of MUX 416 is logic "high" (i.e., logic high level voltage VDD 418). The transition from PSM to PFM mode is triggered by the transition of Pfm_comp_latch 426. If Pfm_comp_latch 426 is low, there is no clock modulated on the gate control signal NMOS_ctrl 420, and the converter operates in a PFM mode. On the other hand, if the Pfm_comp_latch 426 signal is high, OSC_clock 412 will be modulated on the gate control signal NMOS_ctrl 420, and the converter will work in a PSM mode.

Figure 5:
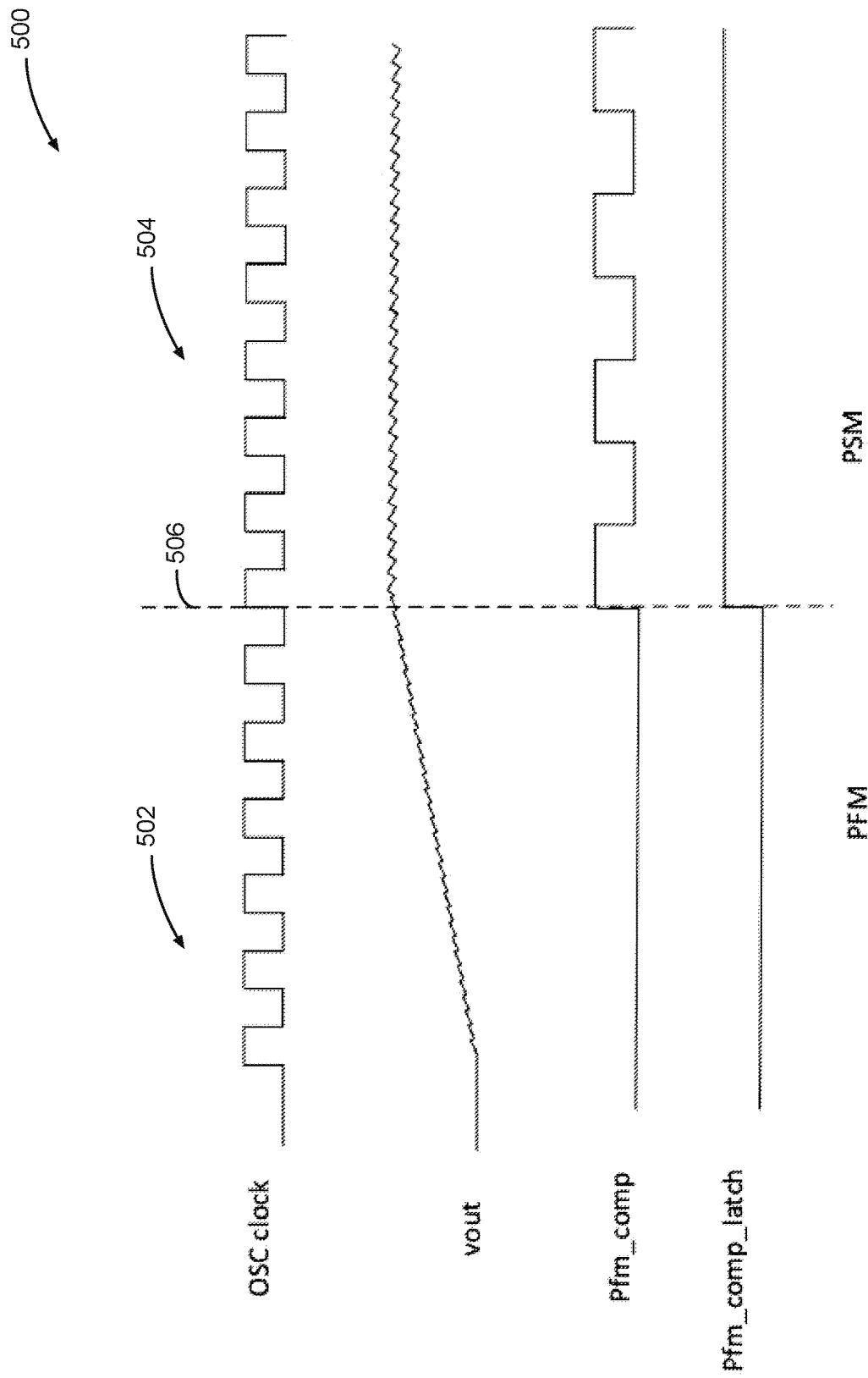
FIG. 5 is a timing diagram depicting an example transition of a boost converter system from a PFM mode to a PSM mode.

FIG. 5 is a timing diagram depicting an example transition 500 of a boost converter system from a PFM mode to a PSM mode. As depicted, transition 500 captures a transition of boost converter system 100 from a PFM mode to a PSM mode. Transition 500 includes a PFM phase 502, and a PSM phase, 504. Transition 500 depicts OSC_clock 412 that is used as a clock signal for boost converter module 108.

In PFM phase 502, Vout 320 is shown to be increasing. As Vout 320 increases, Vfb 330 also increases. During PFM phase 502, Vfb 330 is less than Vref 324, and boost converter module 108 operates in a PFM mode. Pfm_comp 402 and Pfm_comp_latch 426 are both set low.

When Vout 320 increases to a value (i.e., a level) where Vfb 330 is greater than or equal to Vref 324, then boost converter system 100 transitions to a PSM mode, as depicted by PSM phase 504. A demarcation boundary 506 depicts this transition in transition 500.

In an aspect, in the PSM mode, Vout 320 (and Vfb 330) is substantially constant; Pfm_comp 402 is a periodic alternating binary signal. In an aspect, a frequency associated with Pfm_comp 402 may be lower than one half of a frequency of OSC_clock 412 due to PSM operation. In the PSM mode, Pfm_comp_latch 426 is asserted high.

Figure 6:
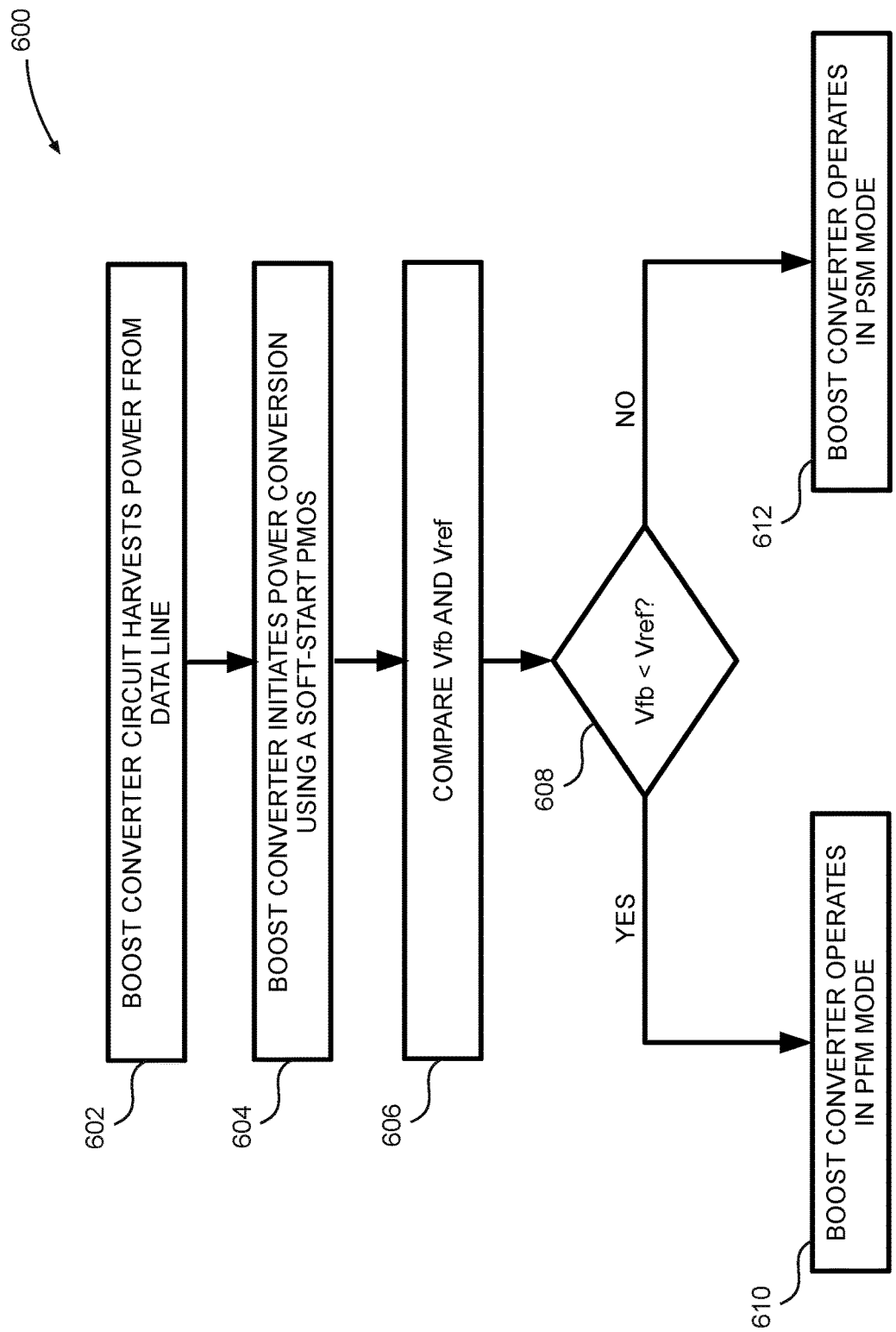
FIG. 6 is a flow diagram depicting an example method for switching between a PFM mode and a PSM mode.

FIG. 6 is a flow diagram depicting an example method 600 for switching between a PFM mode and a PSM mode. Method 600 will be described with respect to the components in FIGS. 1 and 3. Method 600 may include a boost converter circuit harvesting power from a data line (602). For example, power harvester 106 may harvest power from digital data 104 on data line(s) 102.

Method 600 may include a boost converter initiating a power conversion using a soft-start PMOS (604). In an aspect, boost converter system 100 initiates a power conversion using soft-start PMOS 110, where the power conversion is a boost power conversion. The boost power conversion may harvest power from data line(s) 102 and convert the power to an output voltage Vout 112. In an aspect, Vout 112 may be a DC voltage.

Method 600 may include comparing a feedback voltage (Vfb) to a reference voltage (Vref) (606). For example, comparator 302 may compare Vfb 330 and Vref 324.

Method 600 may include determining whether Vfb is less than Vref (608). For example, comparator 302 may determine whether Vfb 330 is less than Vref 324. If Vfb 330 is less than Vref 324 (YES at 608), method 600 goes to 610, where the boost converter operates in a PFM mode. For example, waveform modulation controller 118 can transition boost converter module 108 to operate in a PFM mode. On the other hand, if Vfb 330 is greater than or equal to Vref 324 at (NO at 608), method 600 goes to 612, where the boost converter operates in a PSM mode. For example, waveform modulation control 118 can transition boost converter module 108 to operate in a PSM mode.

In an aspect, if boost converter module 108 is operating in a PFM mode (Vfb<Vref) and Vfb increases such that Vfb>=Vref, then waveform modulation controller 118 can switch boost converter module 108 from the PFM mode to a PSM mode. On the other hand, if boost converter module 108 is operating in a PSM mode (Vfb>=Vref) and Vfb decreases such that Vfb<Vref, then waveform modulation controller 118 can switch boost converter module 108 from the PSM mode to a PFM mode.

Although the present disclosure is described in terms of certain example embodiments, other embodiments will be apparent to those of ordinary skill in the art, given the benefit of this disclosure, including embodiments that do not provide all of the benefits and features set forth herein, which are also within the scope of this disclosure. It is to be understood that other embodiments may be utilized, without departing from the scope of the present disclosure.

What is claimed is:

1. A method comprising:
extracting energy from one or more data lines;
deriving a feedback voltage from the extracted energy;
determining that a value of the feedback voltage is less than a reference voltage value;
responsive to the value of the feedback voltage being less than the reference voltage value, switching a waveform modulation controller to a pulse-frequency modulation (PFM) mode;
subsequent to switching the waveform modulation controller to the PFM mode:
 extracting additional energy from the one or more digital data lines;
 deriving another feedback voltage from the additional extracted energy;
 determining that a value of the other feedback voltage is greater than or equal to the reference voltage value; and
 responsive to the value of the other feedback voltage being greater than the reference voltage value, further switching the waveform modulation controller from the PFM mode to a pulse-skipping modulation (PSM) mode, wherein the switching is performed by a switching circuit comprising at least one latch, at least one multiplexer, a NOR gate, an AND gate, at least one NAND gate, and at least one inverting buffer.

2. The method of claim 1, wherein switching the waveform modulation controller to the pulse-frequency modulation (PFM) mode comprises switching the waveform modulation controller to the pulse-frequency modulation (PFM) mode when a boost converter is powered on.

3. The method of claim 1, further comprising limiting an initial inrush of current associated when a boost converter is powered on.

4. The method of claim 3, wherein the limiting the initial inrush of current comprises a PMOS transistor or an NMOS transistor limiting the initial inrush of current.

5. The method of claim 1, further comprising setting a latch signal in response to determining that the other feedback voltage is greater than or equal to the reference voltage value.

6. A method comprising:
extracting energy from one or more data lines;
deriving a feedback voltage from the extracted energy;
determining that a value of the feedback voltage is greater than or equal to a reference voltage value;
responsive to the value of the feedback voltage being greater than or equal to the reference voltage value, switching a waveform modulation controller to a pulse-skipping modulation (PSM) mode, wherein the switching is performed by a switching circuit comprising at least one latch, at least one multiplexer, a NOR gate, an AND gate, at least one NAND gate, and at least one inverting buffer;
subsequent to switching the waveform modulation controller to the PSM mode:
 extracting additional energy from the one or more digital data lines;
 deriving another feedback voltage from the additional extracted energy;
 determining that a value of the other feedback voltage is less than the reference voltage value; and
 responsive to the value of the other feedback voltage being less than the reference voltage value, further switching the waveform modulation controller from the PSM mode to a pulse-frequency modulation (PFM) mode, wherein the switching is performed by the switching circuit.

7. The method of claim 6, further comprising limiting an initial inrush of current when a boost converter is powered on.

8. The method of claim 7, wherein the limiting an initial inrush current comprises a PMOS transistor or an NMOS transistor limiting the initial inrush current.

9. The method of claim 6, further comprising resetting a latch signal in response to determining that the other feedback voltage is less than the reference voltage value.

10. A boost converter circuit comprising:
a power harvester configured to extract energy from one or more digital data lines;
circuitry configured to derive a feedback voltage from the extracted energy; and
a waveform modulation controller configured to:
compare a feedback voltage value to a reference voltage value; and
operate in one of: a pulse-frequency modulation (PFM) mode or a pulse-skipping modulation (PSM) mode based on results of the comparison, including: (a) switching to the PFM mode when the feedback voltage value transitions from greater than or equal to the reference voltage value to less than the reference voltage value and (b) switching to the pulse-skipping modulation (PSM) mode when the feedback voltage value transitions from less than the reference voltage value to greater than or equal to the reference voltage value, wherein the switching to the PSM mode or to the PFM mode is performed by a switching circuit comprising at least one latch, at least one multiplexer, a NOR gate, an AND gate, at least one NAND gate, and at least one inverting buffer.

11. The boost converter circuit of claim 10, wherein the circuitry configured to derive the feedback voltage from the extracted energy comprises circuitry configured to:
convert the extracted energy into power;
convert the power into an output voltage; and
derive the feedback voltage from the output voltage.

12. The boost converter circuit of claim 11, further comprising additional circuitry configured to limit an inrush of current associated with the power when the boost converter is powered on.

13. The boost converter circuit of claim 12, wherein the additional circuitry includes a PMOS transistor.

14. The boost converter circuit of claim 10, wherein the waveform modulation controller being configured to operate in one of: the pulse-frequency modulation (PFM) mode or the pulse-skipping modulation (PSM) mode comprises the waveform modulation controller being configured to initially operate in the pulse-frequency modulation (PFM) mode when the boost converter circuit is powered on.

15. The boost converter of claim 10, wherein the circuitry is configured as a resistor divider associated with an RC network.

16. A method comprising:
extracting energy from one or more digital data lines;
deriving a feedback voltage from the extracted energy;
based on a value of the feedback voltage relative to a reference voltage value, switching a waveform modulation controller to one of: a pulse-frequency modulation (PFM) mode or a pulse-skipping modulation (PSM) mode, wherein the switching is performed by a switching circuit comprising at least one latch, at least one multiplexer, a NOR gate, an AND gate, at least one NAND gate, and at least one inverting buffer;
subsequent to switching the waveform modulation controller:
extracting additional energy from the one or more digital data lines;
deriving another feedback voltage from the additional extracted energy;
based on a value of the other feedback voltage relative to the reference voltage value, further switching the waveform modulation controller to the other of: the pulse-frequency modulation (PFM) mode or the pulse-skipping modulation (PSM) mode, wherein the switching is performed by the switching circuit.

17. The method of claim 16, wherein the feedback voltage is derived from the extracted energy using a resistor divider associated with a network.

18. The method of claim 16, wherein switching from the PSM mode to the PFM mode is performed based on a value of an output voltage generated by a PFM comparator.

19. The method of claim 16, wherein the switching is governed by an oscillator clock.

20. The method of claim 19, wherein the oscillator clock has a frequency of approximately 1 MHz.

* * * * *